(12) United States Patent
Krinsky et al.

(10) Patent No.: US 8,587,630 B1
(45) Date of Patent: Nov. 19, 2013

(54) ASSESSING PERFORMANCE AND QUALITY OF A MOBILE COMMUNICATION SERVICE

(75) Inventors: Jeffrey A. Krinsky, Woodinville, WA (US); Falguni Sarkar, Redmond, WA (US)

(73) Assignee: AT&T Mobility II LLC, Atlanta, GA (US)

(*) Notice: Subject to any disclaimer, the term of this patent is extended or adjusted under 35 U.S.C. 154(b) by 1699 days.

(21) Appl. No.: 11/624,567

(22) Filed: Jan. 18, 2007

Related U.S. Application Data

(63) Continuation-in-part of application No. 11/227,972, filed on Sep. 15, 2005, now Pat. No. 8,396,468.

(51) Int. Cl.
*H04N 7/14* (2006.01)

(52) U.S. Cl.
CPC .................................. *H04N 7/14* (2013.01)
USPC .................. 348/14.02; 348/14.01; 455/67.13

(58) Field of Classification Search
USPC .......... 348/14.01–14.16; 455/67.13; 725/107, 725/105
See application file for complete search history.

(56) References Cited

U.S. PATENT DOCUMENTS

| | | | |
|---|---|---|---|
| 5,446,492 A | 8/1995 | Wolf et al. ........ | 348/192 |
| 5,734,422 A | 3/1998 | Maurer et al. ........ | 348/184 |
| 5,940,471 A | 8/1999 | Homayoun ........ | 379/1 |
| 6,055,015 A | 4/2000 | Edwards ........ | 348/192 |
| 6,246,435 B1 | 6/2001 | Patel ........ | 348/192 |
| 6,259,477 B1 | 7/2001 | Hu ........ | 348/180 |
| 6,463,265 B1 | 10/2002 | Cohen et al. | |
| 6,496,221 B1 | 12/2002 | Wolf et al. ........ | 348/192 |
| 6,522,888 B1 | 2/2003 | Garceran et al. | |
| 6,678,424 B1 | 1/2004 | Ferguson ........ | 382/286 |
| 7,133,498 B2 | 11/2006 | Cacioppo et al. | |
| 7,450,694 B2 | 11/2008 | Cacioppo et al. | |
| 2001/0016488 A1 | 8/2001 | Haymes | |
| 2003/0040272 A1 | 2/2003 | Lelievre et al. | |
| 2003/0041056 A1 | 2/2003 | Bossemeyer, Jr. et al. ....... | 707/3 |
| 2004/0172323 A1 | 9/2004 | Stamm | |
| 2004/0176040 A1 | 9/2004 | Thornton et al. | |
| 2005/0272437 A1 | 12/2005 | Ritter et al. | |
| 2006/0002540 A1 | 1/2006 | Kreiner et al. ........ | 379/265.02 |
| 2006/0046749 A1 | 3/2006 | Pomerantz et al. | |
| 2006/0073786 A1 | 4/2006 | Sarkar ........ | 455/24 |
| 2006/0087409 A1 | 4/2006 | Korzeniowski | |
| 2006/0199548 A1* | 9/2006 | Saraby ........ | 455/67.13 |
| 2006/0203738 A1 | 9/2006 | Fok et al. | |
| 2006/0227944 A1 | 10/2006 | Paden et al. | |
| 2006/0262793 A1 | 11/2006 | Vare et al. | |

(Continued)

OTHER PUBLICATIONS

U.S. Appl. No. 11/227,972, filed Sep. 15, 2005, Krinsky.

(Continued)

*Primary Examiner* — Melur Ramakrishnaiah
(74) *Attorney, Agent, or Firm* — Woodcock Washburn LLP

(57) ABSTRACT

A video quality monitoring system allows the operator of a user device to report on received video quality. The video quality monitoring system allows the device user to establish or accept a communication that includes video displayed on the user device via a communications network. The video quality monitoring system may provide a manual or automated user-feedback process for the user to specify information about the received video quality as perceived by the user. User feedback may be correlated with time, location, video server performance, call data records, network performance, road traffic and weather data to produce an association of network events and conditions that correspond to user quality ratings.

20 Claims, 12 Drawing Sheets

(56) References Cited

U.S. PATENT DOCUMENTS

2007/0283400 A1* 12/2007 Lee et al. .................... 725/107
2008/0085096 A1*  4/2008 Marshall ...................... 386/52
2008/0248743 A1  10/2008 Krinsky
2009/0111462 A1   4/2009 Krinsky

OTHER PUBLICATIONS

Hall, T.A., "Objective speech quality measures for internet telephone," National Institute of Standards and Technology, year not available, 9 pages.

* cited by examiner

ASSESSING PERFORMANCE AND QUALITY OF A MOBILE COMMUNICATION SERVICE

CROSS REFERENCE TO RELATED APPLICATIONS

This application is a continuation-in-part application of U.S. patent application Ser. No. 11/227,972, filed Sep. 15, 2005, entitled "Assessing Performance and Quality of a Mobile Communication Service", which is incorporated herein by reference in its entirety.

BACKGROUND OF THE INVENTION

Maintaining quality of service in the eyes of customers is an important factor in services industries. This is the case in the wireless/mobile communications industry, as well as the traditional wireline telephone industry where customers often base their decisions to join, or stay with a particular service provider based on the quality of the services provided. For example, with respect to wireless telephones, events such as recurring dropped calls, poor sound quality during calls and unexpected unavailability of service may drive customers to seek a new service provider, especially given rising standards for call quality.

Currently, various techniques exist for monitoring quality of service in the wireless communications industry. Some of these techniques, such as PESQ (Perceptual Evaluation of Speech Quality) obtain objective quality of service information. For example, PESQ measures voice quality by comparing an input test signal with the signal output across a connection. Another objective technique, ITU-T E-model (e.g., ITU-T G. 107) predicts conversational MOS (mean opinion score) from IP networks and/or terminal parameters. Subjective techniques also exist where test mobile devices are established to monitor sound quality. Service providers often arrange for such testing immediately following deployment of new networks, new network elements (such as base stations) and network changes or upgrades, etc.

The techniques described above are often difficult to implement, may be limited in their capability to monitor an entire network, and may be expensive, especially in the case of call quality monitoring techniques that utilize specialized infrastructure. Many of these techniques may also cause unwanted load on the network. In addition, it is often not practical to implement such techniques on a regular basis. In addition, current quality monitoring techniques are difficult to implement throughout the entire network, especially when networks may span large and diverse geographical area. For example, current quality monitoring techniques may be implemented so that a single sector is used to report on the quality of an entire region. Accordingly, it may be difficult to accurately monitor all areas of the network using such techniques.

Figure 1:
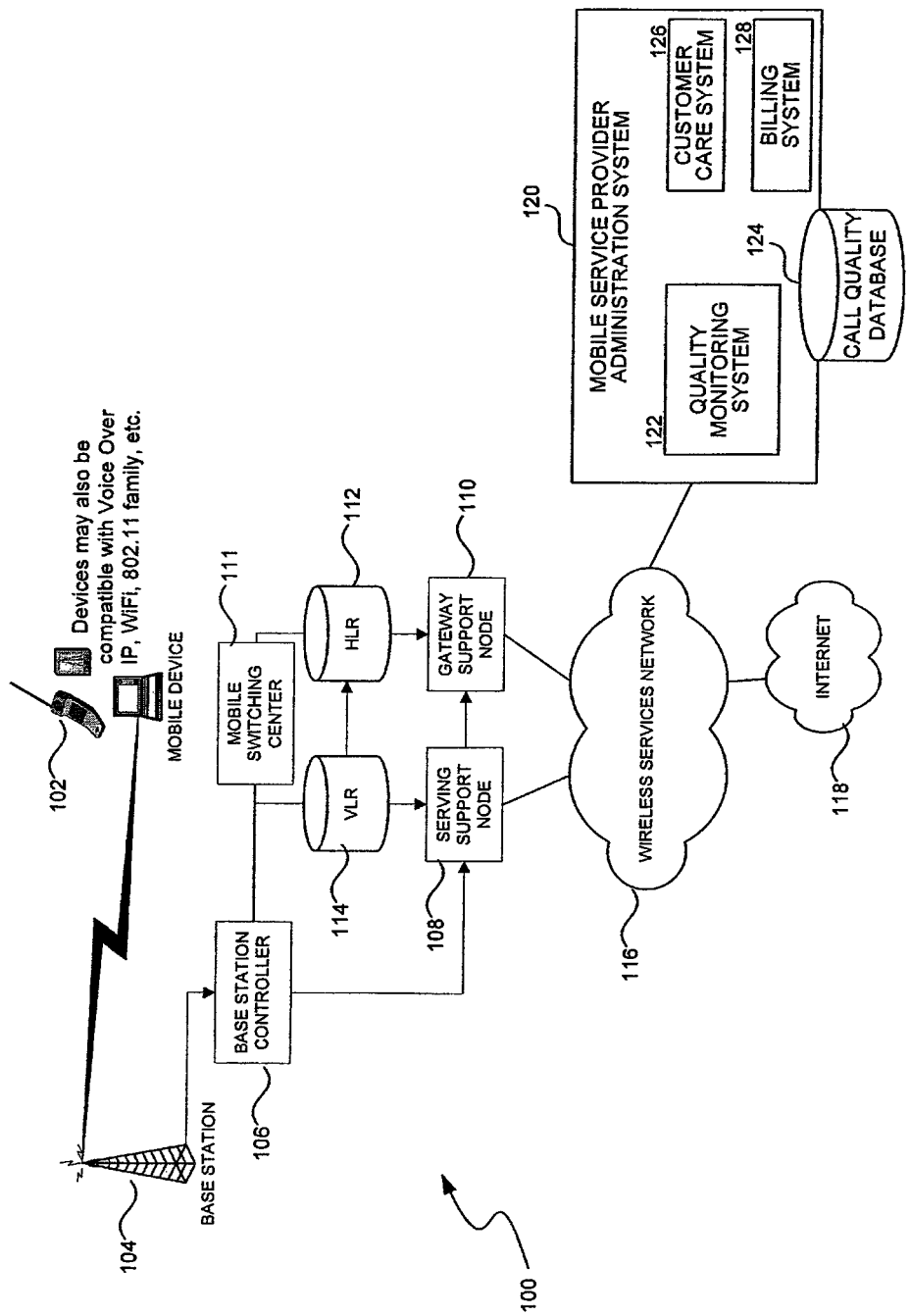
FIG. 1 is a block diagram showing an example of an environment in which the invention may be implemented in one embodiment.

In the drawings, the same reference numbers identify identical or substantially similar elements or acts. To facilitate the discussion of any particular element or act, the most significant digit or digits in a reference number refer to the figure number in which that element is first introduced (e-g., element 204 is first introduced and discussed with respect to FIG. 2).

DETAILED DESCRIPTION OF ILLUSTRATIVE EMBODIMENTS

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

I. REPRESENTATIVE SYSTEM

Figure 2:
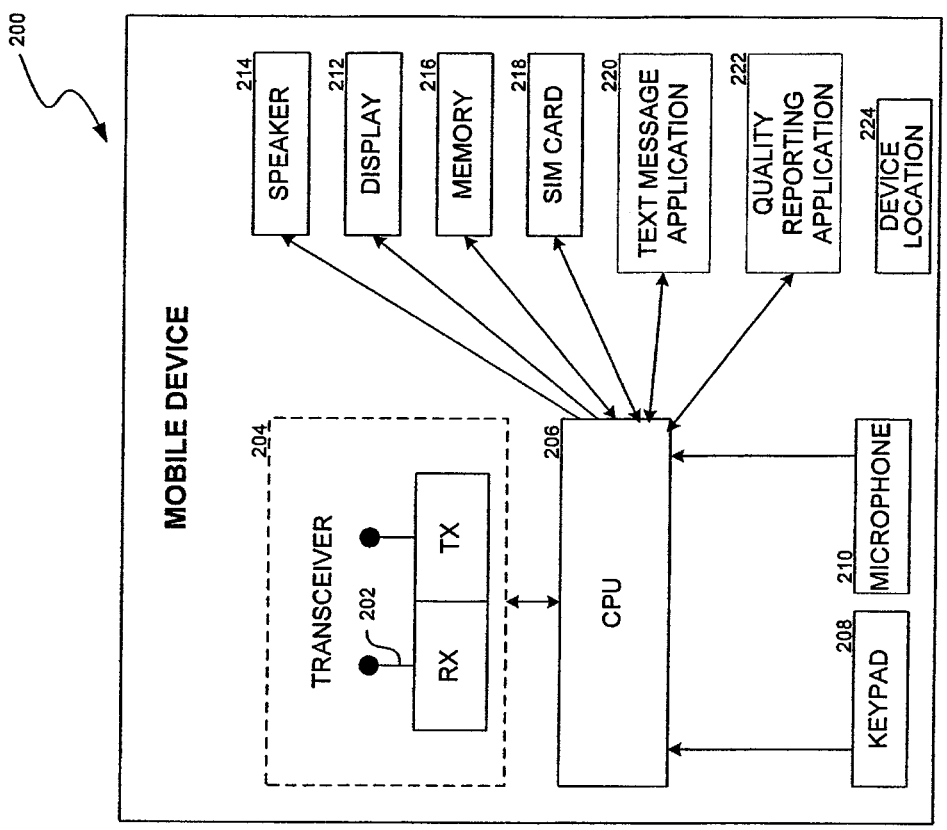
FIG. 2 is a block diagram showing the mobile communication device of FIG. 1 in one embodiment.
Figure 3:
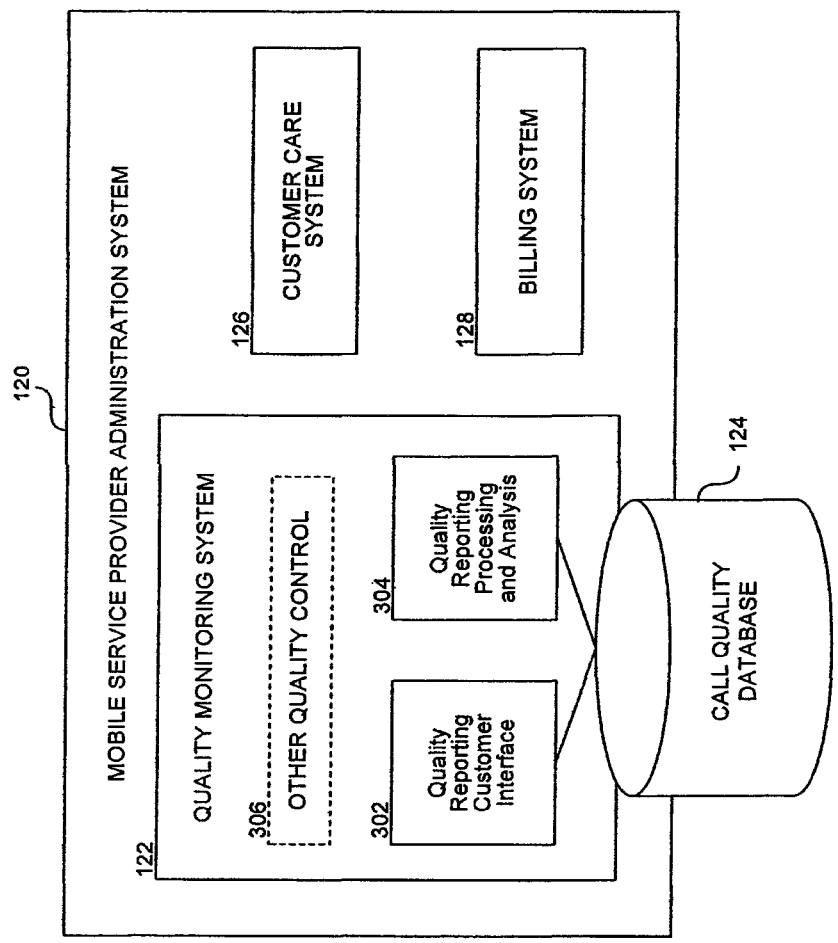
FIG. 3 is block diagram showing components of the mobile service provider administration system of FIG. 1 in one embodiment.

FIGS. 1-3 and the following discussion provide a brief, general description of a suitable computing/network environment in which the call quality monitoring can be implemented. Although not required, aspects of the call quality monitoring are described in the general context of computer-executable instructions, such as routines executed by a general-purpose computer, e.g., a server computer, wireless device, or personal computer. Those skilled in the relevant art will appreciate that the invention can be practiced with other communications, data processing or computer system configurations, including Internet appliances, hand-held devices (including PDAs), wearable computers, all manner of cellular or mobile phones, multi-processor systems, microprocessor-based, ASIC-based, or PGA-based systems, programmable consumer electronics, set-top boxes, network PCs, minicomputers, mainframe computers, and the like. Indeed, the terms "computer," "device," and "component" are generally used broadly and interchangeably, and refer to any of the above devices and systems, as well as any data processor.

Aspects of the call quality monitoring can be embodied in a special purpose computer or data processor that is specifically programmed, configured, or constructed to perform one or more of the computer-executable instructions explained in detail herein. Aspects of the call quality monitoring can also be practiced in distributed computing environments where tasks or modules are performed by remote processing devices, which are linked through a communications network, such as a LAN, WAN, or the Internet. In a distributed computing environment, program modules may be located in both local and remote memory storage devices (e.g., including memory associated with field programs, gate arrays, EPROM memory, etc.).

Aspects of the call quality monitoring may be stored or distributed on computer-readable media, including magnetically or optically readable computer discs, hard-wired or preprogrammed in chips (e.g., EEPROM semiconductor chips), nanotechnology memory, photonic memory, biological-based memory, or other data storage media, including but not limited to any one or more of the following: magnetic, optical, electro optical, semiconductor, and supper conducting. Indeed, computer implemented instructions, data structures, screen displays, and other data under aspects of the invention may be distributed over the Internet or over other networks (including wireless networks), on a propagated signal on a propagation medium (e.g., an electromagnetic wave (s), a sound wave, etc.) over a period of time, or may be provided on any analog or digital network (packet switched, circuit switched, or other scheme). Those skilled in the relevant art will recognize that portions of the invention can reside on a server computer, while corresponding portions reside on a client computer such as a mobile or portable device, and thus, while certain hardware platforms are described herein, aspects of the invention are equally applicable to nodes on a network.

Referring to FIG. 1, a system 100 on which the quality of service assessment system may be implemented is shown. The system of FIG. 1 is an example of a GPRS (general packet radio service) system based on GSM (global system for mobile communication). However, the invention may be implemented on other types of systems, including a variety of cellular systems, as well as other broadcast, multicast and point to point communication systems that are any combination of simplex, half duplex, full duplex including terrestrial broadcast, cable, satellite broadcast, satellite cell, and any one or any combination of PAN, LAN, WAN, MAN, or/and other network(s) including Bluetooth, and 802.11 family. The system 100 includes a mobile device 102 (e.g., mobile phone, PDA, wireless laptop, etc.) in communication with a base station 104. A base station controller 106 in communication with a serving GPRS support node (SGSN) 108 and a gateway GPRS support node (GGSN) 110 together support packet switched transactions, which are handled separately from circuit switched traffic that is supported by a mobile switching center (MSC) 111. The MSC 111 also serves as an access point for the Public Switched Telephone Network.

The SGSN 108, GGSN 110, and MSG 111 interact with a home location register 112 (HLR). In some embodiments, the HLR 112 is the primary database of permanent subscriber customer information for the service provider's mobile network. In the context of activated devices, the HLR 112 may contain pertinent user information, including address information, account status, and preferences. In some embodiments, a visiting location register (VLR) 114 manages requests from out-of-area subscribers who are out of the area covered by their home system.

In the illustrated embodiment, the system 100 includes components associated with quality of service assessment including a mobile service provider administration system 120. The mobile service provider administration system 120 may include a quality monitoring system 122, a call quality database 124, a customer care system 126, and a billing system 128, described in more detail with respect to FIG. 3. Customers may interact with the mobile service provider administration system 120 and its various components via the mobile device 102 and a wireless services network 116, as well as through other means, such as the internet 118.

FIG. 2 shows a block diagram of a typical mobile communication device 200, such as a mobile handset. While a mobile phone is shown as the mobile communication device in FIG. 1, those skilled in the relevant art will appreciate that the invention can be practiced with other devices and configurations, including Internet appliances, hand-held devices, wearable computers, multi-processor systems, microprocessor-based or programmable consumer electronics, set-top boxes, PDAs, portable laptop computers, and the like. The term "mobile device" is intended to include all such devices.

The mobile device 200 has one or more internal or external antennas 202 for receiving and transmitting electromagnetic signals such as radio frequency signals. A transceiver 204 is connected to the antenna(s) 202 and typically provides modulation and demodulation of the transmitted and received signals, respectively. A processor unit 206 connected to the transceiver 204 may comprise a signal processor, microprocessor, ASIC, or other control and processing logic circuitry. The processor unit 206 may perform signal coding, data processing, input output processing, power control, and other functions necessary for implementing a mobile communication device. A customer may provide input to the processor unit 206 via a keypad 208, microphone 210, or display touchpad 212. In turn, the processor unit 206 may provide information to the customer via the display touchpad 212 or a speaker 214.

The processor unit 206 may access information from, and store information in, a nonremovable memory 216 or a removable memory 218. The non-removable memory 216 may consist of RAM, ROM, EPROM, a hard disk, or other memory storage technologies. The removable memory 218 may consist of Subscriber Identity Module (SIM) cards, which are well known in GSM communication systems, or other well-known memory storage technologies, such as "smart cards." Various applications, including text message applications 220 and quality reporting applications 220, could be implemented in either the removable memory 218 or the non-removable memory 216. For example, the applications may include a user interface application (e.g., a Java applet) that allows a user to rate a call or other transaction (e.g., by pushing a particular button). The applications may allow rating in real time (e.g., while a call is in progress) or, alternatively, after call has been completed. In some embodiments, an application used to rate a call or other communication may be located on a device that is separate from the device used to place the call itself (e.g., a smart device with GPS compatibility so that the precise location of the user can be identified if the phone itself does not have such capabilities).

In some embodiments, a device location component 224 allows the location of the device to be known to the wireless service provider, so that the wireless service provider can use this information (or pass it along) for the purpose of assessing call quality factors.

Referring to FIG. 3, a more detailed view of the mobile service provider administration system 120 of FIG. 1 is shown. The mobile service provider administration system 120 may include a call quality monitoring system 122 (also shown in FIG. 1). Various components of the quality monitoring system 122 may include a quality reporting customer interface 302 and a quality reporting processing and analysis component 304. Both of these components may communicate with a call quality database 124 (also shown in FIG. 1). For example, in some embodiments the quality reporting customer interface 302 may provide a way for customers to interact with the quality monitoring system 122 and provide information that can then be processed by the quality reporting processing and analysis component 304.

Both the data collected from the customer using the quality reporting customer interface 302 and the data resulting from processing by the quality reporting processing and analysis component 304 may be stored in the call quality database 124. In some embodiments the quality reporting customer interface 302 may be limited to a physical device interface (as opposed to possessing application-based user interface characteristics). For example, if the user's mobile device includes a comprehensive interface for providing quality reporting information, the quality reporting customer interface 302 may simply be an interface to retrieve information from the device. In contrast, if the user's mobile device does not include a comprehensive reporting interface, the quality reporting customer interface 302 may include various features that allow users to answer questions and/or provide statements about the quality of their calls. For example, in some embodiments, quality reporting customer interface 302 may include automated telephone questioning systems, a web server and related applications for providing online questionnaires, etc.

In some embodiments, the quality monitoring system 122 may also include other quality control components 306. For example these other quality control components may use objective standards for providing quality control information. Examples include PESQ systems, systems employing test mobile devices, etc. In some embodiments, the information collected by the other quality control components 306 may be compared with information obtained and retrieved by the quality reporting customer interface 302 and processed by the quality reporting processing and analysis component 304.

As described with respect to FIG. 1, the mobile service provider administration system 120 may also include a customer care system 126 and a billing system 128, which may optionally interact with the quality monitoring system 122 to address customer concerns such as dropped calls, credits to service plans, etc.

Unless described otherwise below, aspects of the invention may be practiced with conventional systems. Thus, the construction and operation of the various blocks shown in FIGS. 1-3 may be of conventional design, and need not be described in further detail herein to make and use the invention, because such blocks will be understood by those skilled in the relevant art. One skilled in the relevant art can readily make any modifications necessary to the blocks in FIGS. 1-3 (or other embodiments or Figures) based on the detailed description provided herein.

II. SYSTEM FLOWS

Figure 4A:
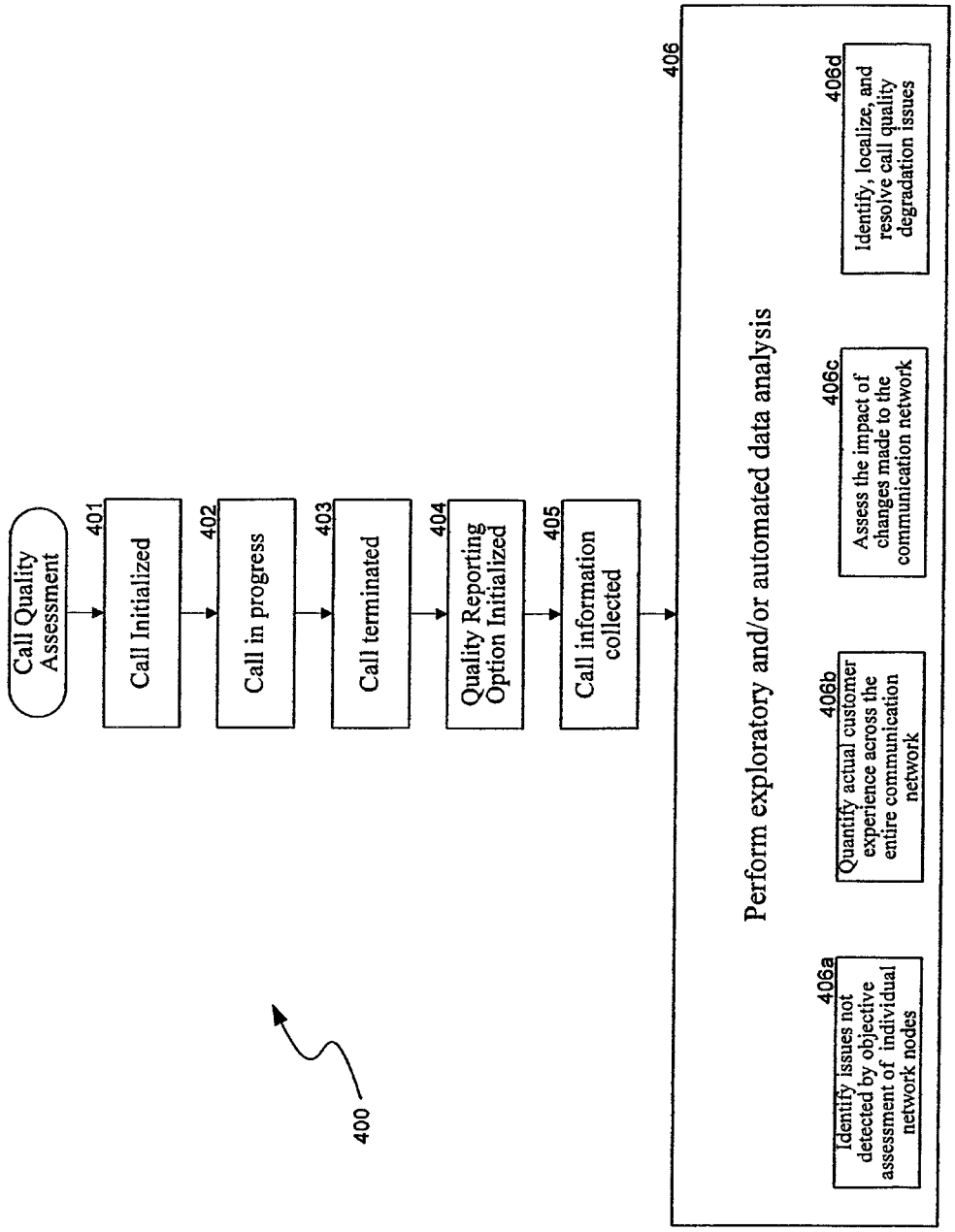
FIGS. 4A and 4B are flow diagrams showing examples of high level call quality assessment routines in some embodiments.

Referring to FIG. 4A, a high level call quality assessment routine 400 may provide a means for customers to report on call quality in accordance with some embodiments. At block 401 a call is initiated, which may include initiation at the network level and/or at the device level. At block 402 the call is in progress. At block 403 the call is terminated. For example, the user may have hung up the device to end the call, or the call may have been dropped due to inadequate service.

At block 404 a quality reporting option is initialized upon termination of the call. For example, the user may receive a message requesting input on the quality of the call or may be given the option to make a call to an automated quality monitoring reporting system. Many options for reporting are available without departing from the scope of the invention. At block 405 the quality monitoring system collects call information. At block 406 the quality monitoring system performs exploratory and/or automated data analysis. As a result of this data analysis, the quality monitoring system may identify issues not detected by objective assessment of individual network modes (block 406*a*); quantify actual customer experience across the entire communication network (block 406*b*); assess the impact of changes made to the communication network (block 406*c*); identify, localize, and resolve call quality degradation issues (block 406*d*), etc.

Figure 4B:
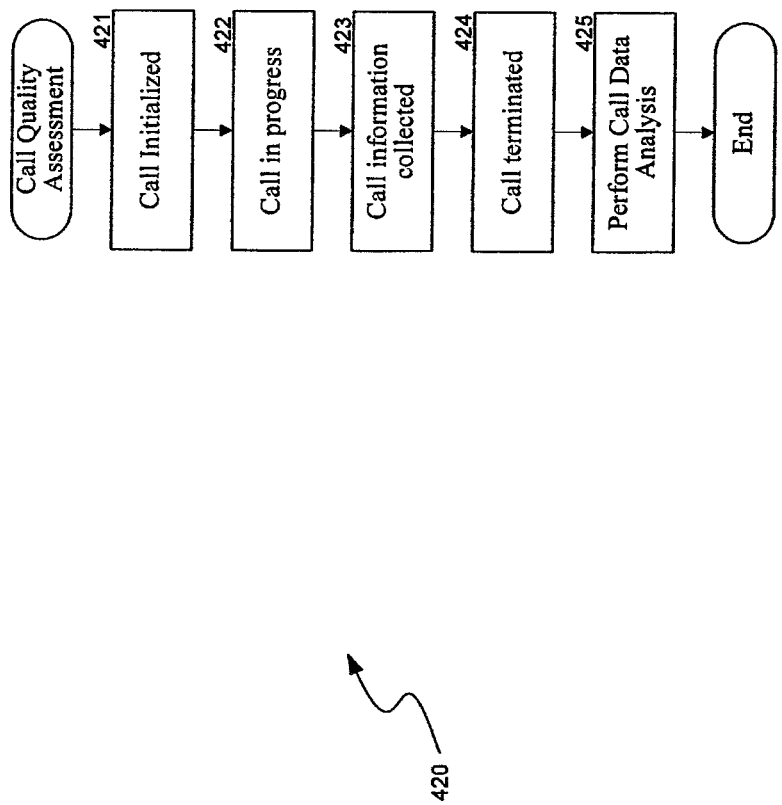

FIG. 4B shows a high level call quality assessment routine 420, similar to the routine 400 of FIG. 4A, but where the call quality information is collected from the user while the call is still in progress. For example at block 421*a* call is initiated, which may include initiation at the network level and/or at the device level. At block 422 the call is in progress. At block 423, the quality monitoring system collects call information during the call. For example, the user may be able to push a button on the phone each time he or she feels that call quality during the call is below an acceptable level. At block 424 the call is terminated. For example, the user may have hung up the device to end the call, or the call may have been dropped due to inadequate service. At block 425 the quality monitoring system performs exploratory and/or automated data analysis based on the information collected at block 423. Some of this analysis may also occur while the call is in progress. As a result of this data analysis, the quality monitoring system may identify issues not detected by objective assessment of individual network modes, quantify actual customer experience across the entire communication network, assess the impact of changes made to the communication network, identify, localize, and resolve call quality degradation issues, etc.

Figure 5:
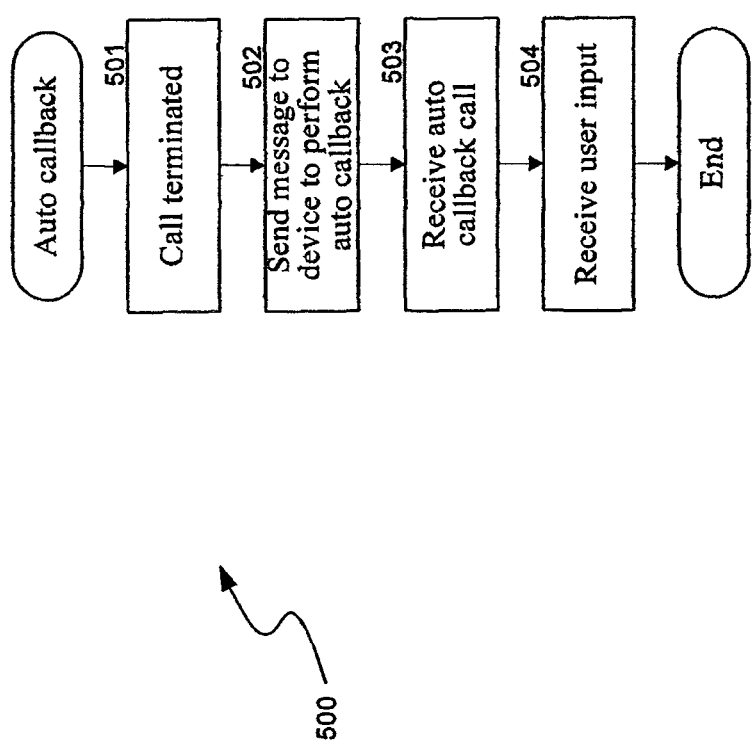
FIG. 5 is a flow diagram showing an example of an automatic callback routine for reporting on call quality in one embodiment.

FIG. 5 is a flow diagram showing an example of a routine 500 for collecting quality information is collected by an automatic callback feature. At block 501 the call is terminated. At block 502 the quality monitoring system sends a message to the device to perform auto callback upon completion of a call. Alternatively, the device may be programmed to automatically place such a call, depending on the conditions present at the device (e-g., termination of a call by the user, termination of a call due to loss of service or other network problem, etc.

At block 503 the quality monitoring system receives a callback from the mobile device. When this occurs, mobile device may ring as the call is being placed automatically by the mobile device. In some cases the user may have the option of hanging up or discontinuing the feedback call if the user does not want to provide input at this time. At block 504 the quality monitoring system receives user input via the automatic call. The routine 500 ends after block 504.

Figure 6:
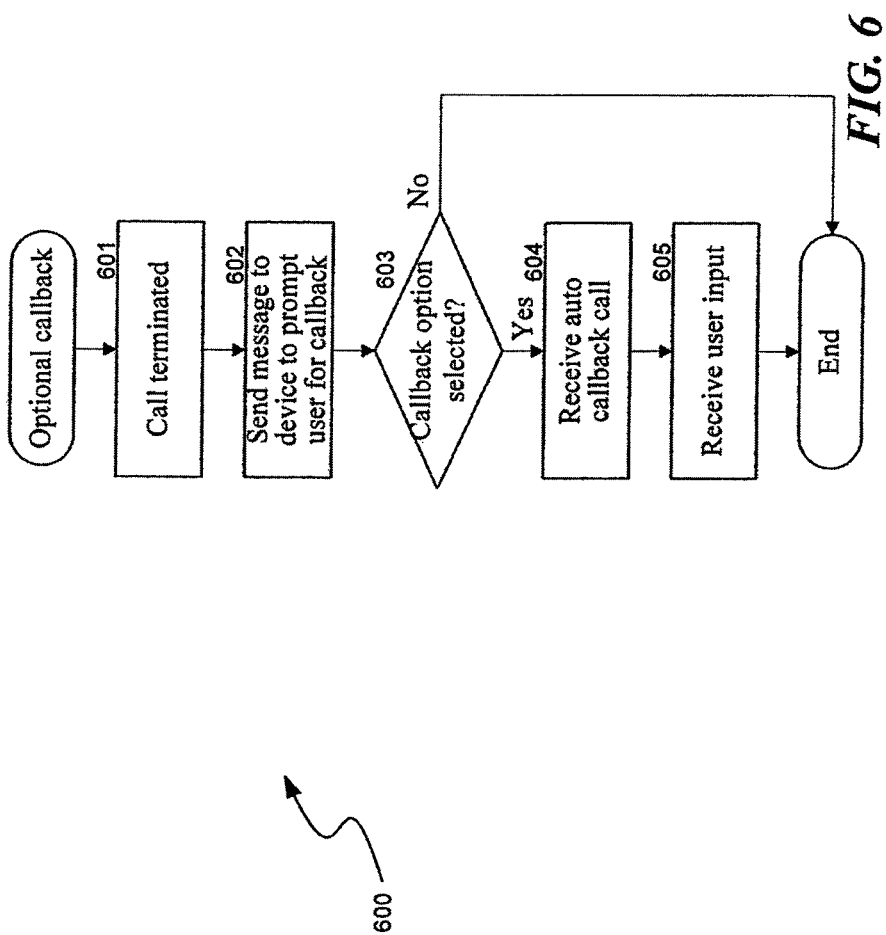
FIG. 6 is flow diagram showing an example of an optional callback routine for reporting on call quality in one embodiment.

FIG. 6 is a flow diagram showing an example of a callback option routine 600 for providing an opportunity for the user to optionally provide feedback on a call that was recently made. In this routine 600, the user has the option of whether or not to continue with a reporting call before the call is made. At block 601*a* call is terminated. At block 602 the quality monitoring system sends a message to the device to prompt the user for a callback. Alternatively, the device may be programmed to display such a message without a prompt from the quality monitoring system. For example the user may receive a message displayed on his or her device screen requesting whether he or she would like to call back and report on call quality at the current time.

At decision block 603, if the user selects to go forward with the callback option, the routine 600 continues at block 604. Otherwise the routine ends without reporting. At block 604 the routine receives an auto callback call from the device in response to the user's selection to provide feedback. At block 605 the quality monitoring system receives user input. After block 605 the routine ends.

Figure 7:
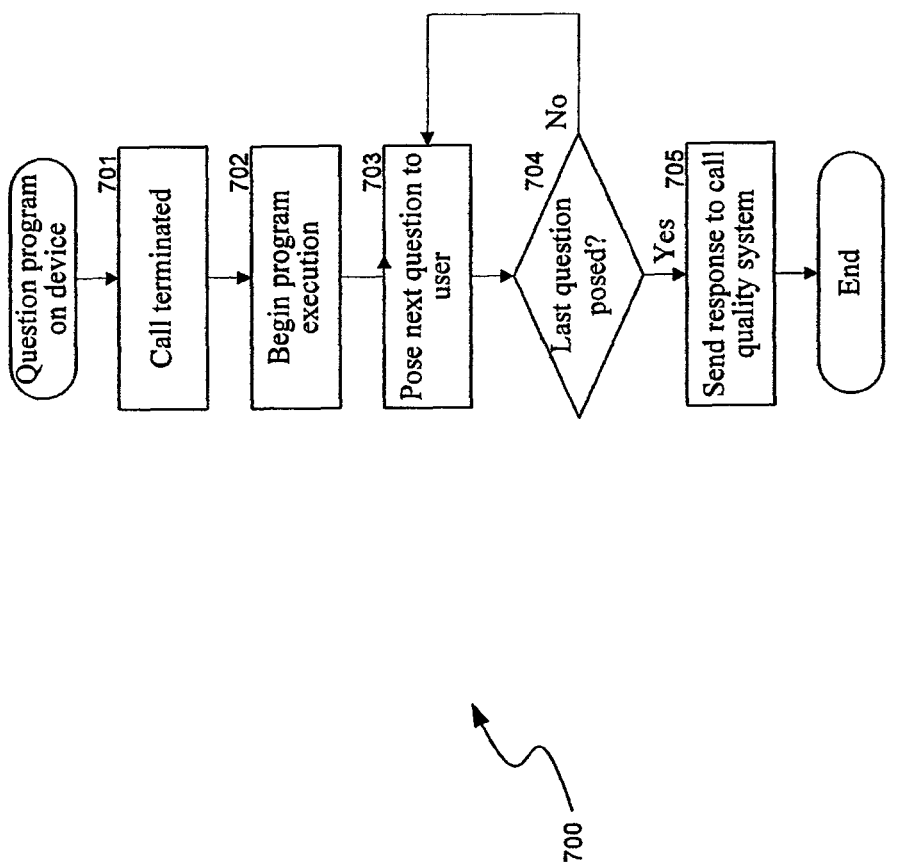
FIG. 7 is flow diagram showing an example of routine at the mobile device of FIGS. 1 and 2 for reporting on call quality using a questionnaire in one embodiment.

FIG. 7 is a flow diagram showing an example of a routine 700 for a post-call questionnaire, where the questionnaire is executed by a program on the mobile device itself. At block 701 the call is terminated. At block 702 the routine 700 begins executing at the mobile device. At block 703 the routine 700 poses a next question to the user. At decision block 704 if the routine 700 has posed a last question to the user, the routine 700 continues at block 705. Otherwise, the routine 700 loops back to block 703 to pose the next question to the user. At block 705, assuming all questions have been posed to the user, the routine 700 sends a response to the call quality monitoring system. For example, the routine 700 may provide data comprising a completed series of questions or statements by the user on call quality.

Figure 8:
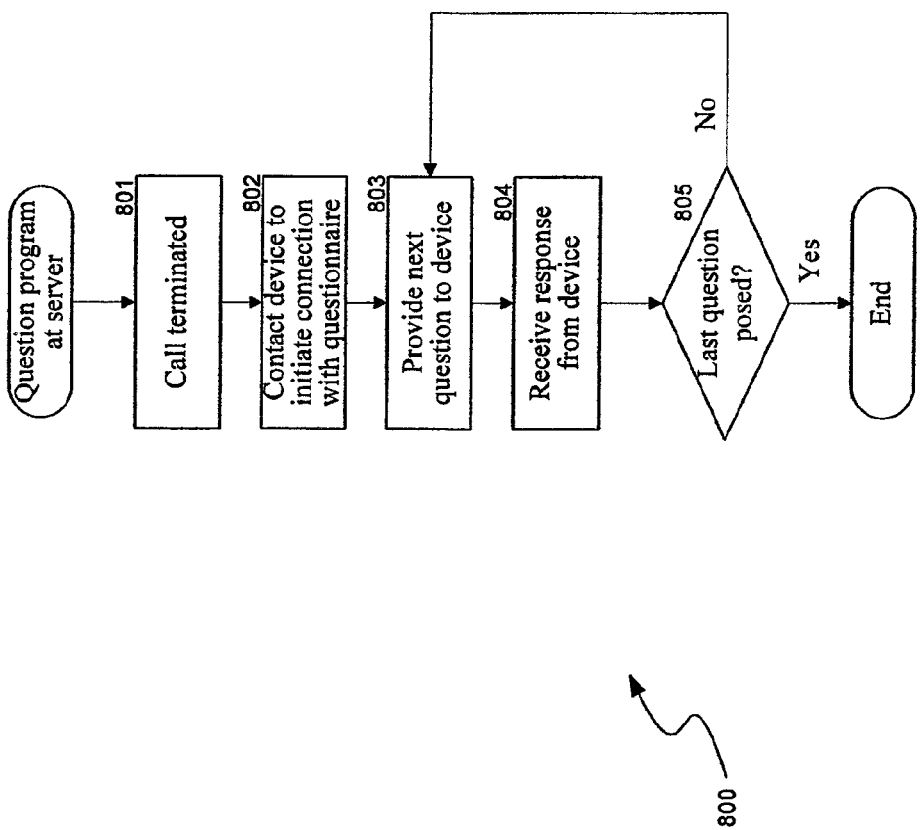
FIG. 8 is flow diagram showing an example of routine at the mobile service provider system of FIGS. 1 and 3 for reporting on call quality using a questionnaire in one embodiment.

FIG. 8 is a flow diagram showing an example of a routine 800 for presenting a post call questionnaire to the user of a mobile device, where the routine 800 is executed from the quality monitoring system. At block 801 the call is terminated. At block 802 the routine 800 contacts the device to initiate connection with the questionnaire application. At block 803 the routine 800 provides a next question to the device. At block 804 the routine 800 receives a response from the device (e.g., provided by the user as a response to a question in the questionnaire). At decision block 805, if the last question has been posed, the routine 800 ends. Otherwise, the routine 800 moves back to block 803 to provide the next question to the device.

III. USER INTERFACE FOR COLLECTIONS CALL QUALITY INFORMATION

Figure 9:
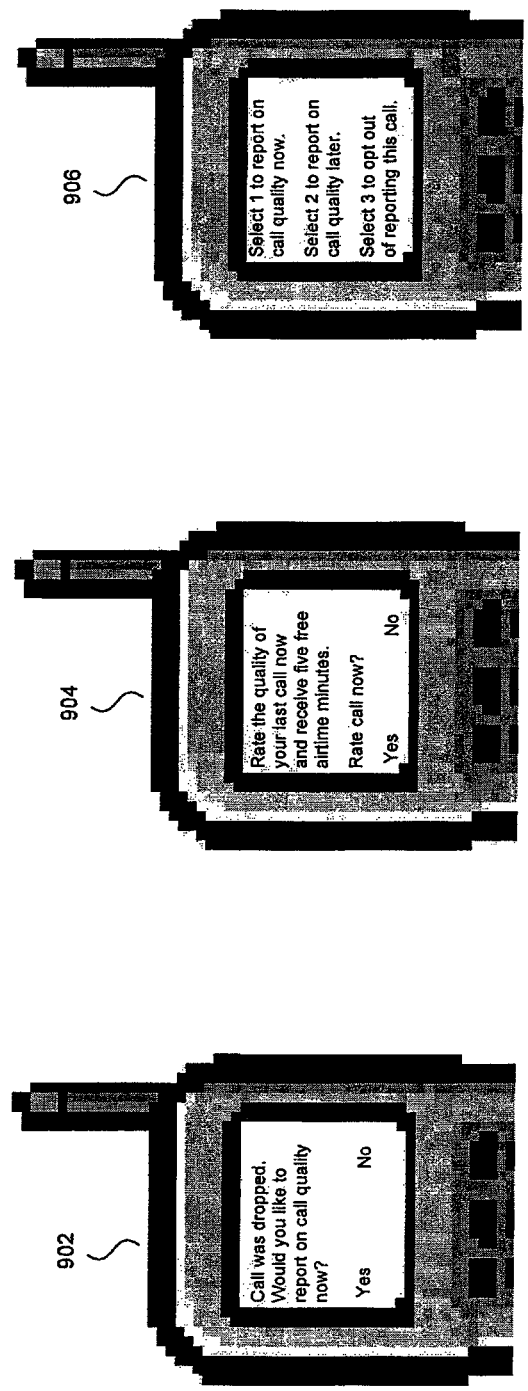
FIG. 9 is a display diagram showing an example of a user interface for acquiring call quality information from a user of a mobile device in one embodiment.

FIG. 9 is a display diagram showing various examples of providing a user of a mobile device with an option to answer questions relating to call quality. With respect to display 902, a call has been dropped due to a service problem, and the user is asked:

"Would you like to report on call quality now?" In this example, the user may select either "yes" or "no" using appropriate device keys.

In another example shown in display 904, a message provides: "Rate the quality of your last call now and receive free airtime minutes." The user may then respond "yes" or "no" as to whether he or she wishes to rate the call at the present time.

In a third example shown in display 906, a message provides three rating options: "Select 1 to report on call quality now"; "Select 2 to report on call quality later"; and "Select 3 to opt out of reporting call quality in relation to the current call." If the user selects the first option, the device may present a text questionnaire to the user or make a call to an automated quality reporting system, as described in more detail in the preceding flow diagrams and with respect to FIG. 10. Alternatively if the user selects to report on call quality later, the user may be given the option to provide feedback at a later time via any one of a number of means (e.g., Internet questionnaire, automated, call, text message on device screen, etc.).

Figure 10:
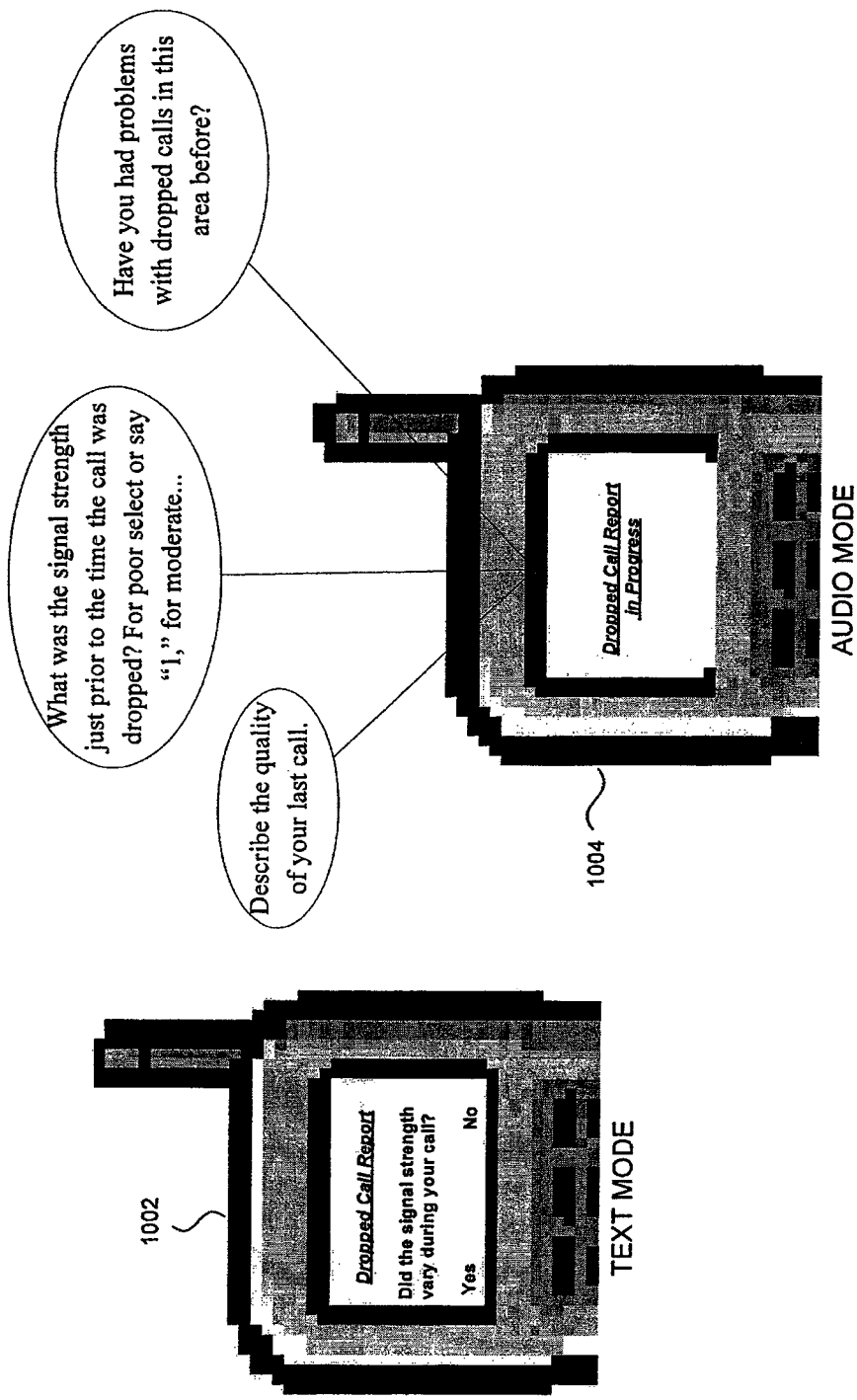
FIG. 10 is a display diagram showing a second example of a user interface for acquiring call quality information from a user of a mobile device in one embodiment.

FIG. 10 is a display diagram showing an example of a user interface for reporting call quality. Display 1002 shows a text mode where the user is asked to report on call quality after a dropped call using text messaging or similar means. For example the user may be requested to answer the question: "Did the signal strength vary during your call?" To this the user may respond either "yes" or "no" using appropriate buttons on his or her device.

Display 1004 illustrates reporting on call quality using an audio mode (e-g., automated telephone system). For example, the user may be asked to "describe the quality of your last call." The user's response may then be recorded and or automatically processed. In another example, the user may be asked: "What was the signal strength just prior to the time that the call was dropped? For poor select or say 1, or moderate . . . ." Another question that the user may be asked is "Have you had problems with dropped calls in this area before?"

While specific examples are given here for the purpose of illustration, regardless of the mode used (e.g., text mode 1002, in an audio mode 1004, or in another mode not illustrated here), any number of questions may be asked to the user for quality reporting. While by no means all inclusive, the table below shows examples of other types of questions that may be posed to users in determining call quality:

| Sound Quality |
| --- |
| On a scale of 1-5, with 5 being the best quality sound, how would you rate the quality of the sound of your call? Were you able to hear the person on the other end of the line clearly during the call? Never? Rarely? Most of the time? Always? Was the person on the other end of the line able to hear you during the call? Never? Rarely? Most of the time? Always? Do you have repeated problems with sound quality when placing calls in this area? |

| Noise |
| --- |
| On a scale of 0-5 with 0 being no detectable background noise, how would you rate the amount of background noise of your call? How often were you able to hear unwanted background noise during your call? Never? Rarely? Most of the time? Always? What was the severity of background noise during your call? Greatly affected ability to hear content of call. Somewhat affected ability to hear content of call. Did not affect the ability to hear content of call but was annoying. Was audible but not distracting. No detectable background noise present Do you have repeated problems with sound quality when placing calls in this area? |

| Dropped Call |
| --- |
| Did the signal strength vary during your call? What was the signal strength at the time the call was placed? What was the signal strength just prior to the time the call was dropped? Have you had problems with dropped calls in this area before? How many calls do you make in the area that the call was dropped? How many times did you attempt to reconnect the same call? |

| Subjective Reponses |
| --- |
| Describe the quality of your last call. Describe your overall satisfaction with the quality of your last call. Describe how the quality of your last call could have been improved. Describe your overall experience with your wireless communication service provider. Describe your overall satisfaction with your wireless communication service provider. Other |

-continued

> Did you have dial tone problems when making this call?
> Press 1 for yes. Press 2 for no.
> Rate the call set up time for this call.
> Please indicate if there were issues disconnecting from this call.
> Please indicate if there were problems handing off between cells during this call.

In addition to the above, other factors and techniques may be used in rating calls. For example, various different types of rating scales may be implemented. In another example, users may be provided with descriptive icons or graphics to select from to make call rating fast and easy.

IV. VIDEO RECEPTION QUALITY ASSESSMENT

In another aspect of the invention, video quality may be assessed from a user perspective. In this aspect, the user can provide feedback on the perceived quality of video and other services. A long history of measuring voice quality exists. However the ability to objectively measure video and still picture quality is much more difficult than voice quality assessment.

Compression of multimedia services (including video, photographs and sound) in some cases complicates the performance measurement process. While low bit and block error rates can contribute to the quality of a multimedia experience the perceived degradation caused by block or multiple block loss depends on the information in the block and how that loss is handled by the systems that utilizes that information. This process has been difficult to measure analytically and usually requires access to both the source and delivered information. Some indicators for video, such as number of frames missed and frame rate linearity can give some indication quality, but as more advance compression techniques are used the ability to correlate a measured score with user experience becomes more difficult. Other factors include the time delay between audio and video signals such as in sound/video sync or lip sync.

Historically, subjective tests of video and other media or content have been considered very expensive and time consuming. This has been for the most part true, especially if subjective testing is used to monitor a large distributed system such as a national or international cell phone network or satellite broadcast distribution system that is in continuous operation in many places by a multitude of users. In one aspect of the invention, the new approach discussed herein provides monitoring and feedback of the customer experience while incurring only small penalties in time and cost. Furthermore, this approach can scale to large distributed systems such as national and international wireless cell phone networks.

In one aspect, a video assessment captures the customer's perception of their experience and thus eliminates the differences between perceived and measured values. Techniques that utilize objective techniques are still useful. Objective techniques may be used to predict subjective performance and, as such, may attempt to reduce the difference between objective and subjective measurements. However, objective techniques often require a direct or indirect comparison to the video source material. Since, in one aspect, the present invention measures the perception of the end user of the actual video content that is being transmitted, the differences between the customer and test content are eliminated. Some examples of user experience that could be reported include delayed reception and display of a video message, poor streaming video performance, dropped connection for a video conference, an attempt to receive video where no coverage exists, delayed e-mail delivery that has video content, poor broadcast radio or TV reception, poor view ability of visual content due to the handset issues in various temperatures, ambient lighting, etc.

Many factors go into making a high quality video experience and if any one is degraded it can impact the end user experience. Some of the factors include sharpness, contrast, brightness, color accuracy, color saturation, color bit depth, image stability, digitization/video artifacts, distortions (keystone, barrel, pincushion), jitter, latency, frame rate and frame rate linearity, and ambient viewer conditions. A similar list of important factors exists for still images. In addition, combining a laundry list of required factors into an accurate customer perceived experience is quite difficult. For example, in the case of cell phone delivered services, the calculated customer perceived performance is dependent on WAN and RF performance. However, a subjective assessment of the user experience, as provided by the user can be a valuable data point in an assessment of received video data at a user device.

In one aspect of the invention, subjective information is acquired from the user which indicates their video viewing experience in receiving video through a network. Also, aspects of the present invention may be applied to wireless services (e.g., SMS, PTP, MMS, IMS, MWI, video), wired services (voice, video, etc.), broadcast, multicast, uni-cast services, simplex, half duplex and full duplex services, real time, near real time and stored forward services such as broadcast radio, streaming media, and e-mail, and single and multi player gaming applications. This list of applications for subjective received video performance applies to traditional mobile and cell phones and other devices including smart phones, multifunction devices, dedicated devices (e.g., music and video players) wireless PDAs and computers (including handheld, palm held, laptop, desktop, wearable, etc.) and other electronic content storage and delivery devices and media.

In one aspect of the invention, the video quality assessment does not have to compare a quality of the video source material with the quality of the received and displayed video. However, if a side by side comparison of perfect quality source material is available (e.g., a prerecorded broadcast) it could be used in a side by side comparison to determine the amount of degradation caused by the transmission, reception, and display of the video on the user device. In general, correlating the user device with location (spatial) and time (temporal) information further increases the value of the collected subjective information. For example, in the case of wireless services, knowing where and when poor or good service was received can help correlate the user reported data with other infrastructure data such as outage or geographic coverage issues and reports from other users. Thus, the use of accurate time and position date can enhance the subjective information value. However, the use of geographical and temporal data associated with the subjective video quality information is not a strict requirement for the video assessment to be useful.

In application, a subjective video quality assessment system may be applied to a variety of system applications which include the feature of a delivery or reception of video where a user is present to provide a subjective rating. Example systems include conventional wired systems having a LAN or WAN connection, such as a voice over IP system, a terrestrial telephone system, a point to point system, and a theater system. Wireless applications for the video quality assessment discussed herein may include terrestrial cellular, general RF communications systems, and satellite systems.

Figure 11:
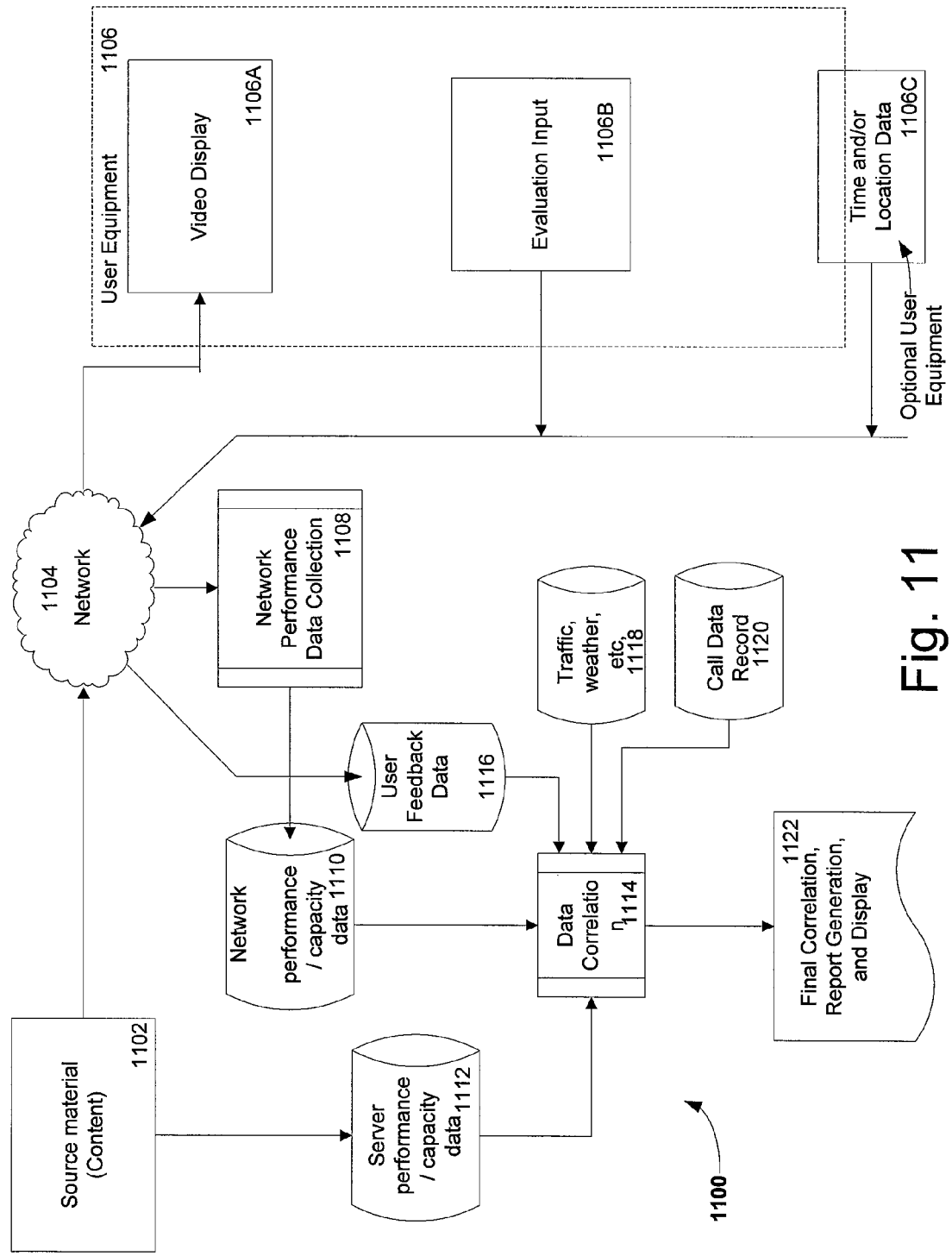
FIG. 11 is a block diagram of an example video quality assessment system.

One such embodiment is in a wireless network having a wireless user equipment which can be a mobile telephone, a PDA, a laptop computer, or other wireless end-user equipment having video display capability. FIG. 11 depicts an example system 1100 useful to subjectively assess the quality of a video signal presented for viewing to a user. Video source material or video content may be presented by a server 1102 to user equipment 1106 via wireless network 1104. In one typical scenario, a user operating the user equipment 1106, requests a video image via the network 1104. The network 1104 may be either a wireless network, such as a cellular telephone network or other type of digital services network supporting such user equipment such as an e-mail devices, PDAs, and laptop computers. The network 1104 may also be a wired network such as a point to point system, a LAN or a WAN. At the user equipment 1106, the video is received and displayed 1106A to the user.

The system 1100 permits a user to provide subjective feedback concerning the video images(s) displayed 1106A on the user equipment 1106. The subjective user input 1106B, also called subjective user feedback, may be provided in a number of different ways. In one embodiment, a manual evaluation mode of subjective feedback may be used. In this mode, a user would construct a message that is sent to the user data feedback data store 1116. In the fully manual mode, a user may input the time, position, and conditions of the call as text entered through the keypad of the user equipment 1106. Another embodiment in manual mode is to record a voice message having the same information as the text message. The voice message would be sent to the user feedback store 1116 for evaluation.

In another embodiment, the user equipment 1106 may solicit user subjective information using an automated mode via the evaluation input function 1106B. In the automatic mode, the user may select a menu option while watching a video so that the user can rate the quality of the video as it is being viewed in real time. In this mode the local time, and optionally the position may be entered using automated user equipment 1106 resources such as an internal clock and/or an internal global positioning system. Alternately, the position information can be calculated by network resources such as location determination equipment as described below.

In an alternative embodiment, the feedback provided may be augmented with objective type feedback. For example, along with user feedback data, objective data could contain an estimate of video quality. Any type of objective measurement scheme can be used in conjunction with the present invention. In embodiments where the subjective indicia of video quality of the present invention is provided without knowledge of the source image quality, additional objective indicia may associated with or without knowledge of the source video quality without departing from the spirit of the invention.

In one embodiment, where the user equipment 1106 is a wireless mobile device 200 as shown in FIG. 2, the quality reporting application 222 provides the interface for the manual and automatic modes of the subjective user input to the user equipment 1106. In general, the process of collecting and analyzing subjective user feedback comports with the method of FIG. 4A. In the specific example of the acquisition of user feedback during the time that video is being displayed to the user, the flow of FIG. 4B may be employed. In the specific instance when an auto callback is used to collect the user subjective information, the flow of FIG. 5 or 6 may be used. Post call questions may also be employed to collect user information and the basic flow for that user interface may be conducted as per the flows of FIGS. 7 and 8.

Returning to FIG. 11, in one embodiment, time and/or location information is made available in conjunction with a user subjective input. The time and/or location function 1106C may be implemented to be either within or outside of the user equipment 1106. If implemented within the user equipment, the time function 1106C can provide a time tag for subjective information input by the user. For example, in one scenario, where a user is watching a streaming video, the user may, in real time, press menu keys on the user equipment to rate the quality of the streaming video. The user may input a 5 for excellent quality video and a 1 for very poor quality video. As the user actuates a soft key or other input device, a time function 1106C preferably located within the user equipment 1106 time tags the information so that the subjective rating information may be correlated temporally.

If the time and/or location function 1106C is implemented outside the user device, then the time and/or location information function may be part of a wireless network providers equipment. Concerning the time function, subjective rating inputs from the user would be time tagged as they were stored on the wireless system. In general, it is preferable to provide time tagging within the user device, but for service-provider based time tagging may also be used.

Considering the location function 1106C, it may reside within the user equipment or outside of the user equipment. Location determination may be performed in a variety of ways. In one embodiment, if the location function resides within the user device, a global positioning system (GPS) receiver/processor may be built into the user device such that location information is provided and tagged to one or more user subjective rating inputs. Differential GPS and Assisted GPS schemes may be implemented. Other satellite-based systems may also provide location information as well. In another embodiment within the user equipment, the location function may be such that the user is prompted to enter location information onto the user equipment. That user location information may then be sent out along with the subjective user rating to assist in the location of the user device.

The location function 1106C may also be located outside of the user device and be part of the wireless network. An example of a location function attached to the user network is a time difference of arrival (TDOA) calculation scheme. Another implementation is an angle of arrival (AOA) scheme. Those of skill in the art will recognize that terrestrial-based locations mechanisms such as TDOA and AOA location schemes can provide the location of the user equipment using measurements from multiple base stations. This location information can be used to augment the subjective rating input information from the user concerning the quality of video received on the user equipment.

Subjective user feedback may be sent back through the network 1104 to be received and stored on a database 1116 on the network 1104 which accumulates the user feedback data for storage or buffering. The storage 1116 may be local or remote storage component as part of a data acquisition server, or may be implemented as an integral part of a base station. The user feedback information is accessed from storage 1116 by a data correlator 1114. The data correlator can associate the user feedback information with other network performance information to provide useful event and condition information of the network 1104. In one embodiment, the data correlator is part of the quality reporting, processing and analysis block 304 of the quality monitoring system 122 shown in FIG. 3.

In on aspect of the invention, network performance data is acquired by observing network events and conditions. In one example, a network monitor 1108 collects network performance in a wireless network 1104. Network events such as call setups, teardowns, dropped packets and calls, switching failures, and outages are collected using the network performance monitor 1108. Also collected are performance parameters and conditions such as bandwidth utilization, packet loss, call volume and call traffic handling, data link routing and switching element performance and switching configurations for base station and cell tower configurations as well as capacity information. Such network events and conditions represent the performance, capacity, and configuration of the network 1104. The network performance and capacity data is recorded using a storage device 1110.

The data correlator can input the user feedback information 1116 with the network performance data from database 1110. By performing a correlation between the subjective user feedback and the performance of the network, an association can be made whereby a cause and effect may be identified. For example, if a network switch lost power or otherwise failed during transmission of a video stream to a user, then the user may experience a loss of signal at that time. By correlating the failure event to the subjective experience data provided by the user, a cause (the switch power failure) and the effect (loss of video stream) can be identified. In a less obvious case, if a degradation of the video stream is perceived by the user, and if the correlated network performance data indicates that the packet loss rate increased at the time when the user experienced the poor quality video, then the packet loss might be related to the video quality drop. Further processing or investigation may then reveal that a change in the network performance, such as when a marked increase in call volume occurred for a base station at the same time. Such a correlation can provide insight to a system administrator that a network traffic routing adjustment may be needed for a group of base stations at a specific time of day.

Correlated information can be useful to determine the cause and effect of problems that cover a wide geographic area during by identifying a common element such as latency on a server or switching or routing element, problems that correlate to a specific area (e.g., a single cell site sector) indicating a coverage, capacity or perhaps interference issue, problems that correlate to specific types of video content, or problems that correlate to specific types of handsets or combinations of handsets. Thus, the value of correlating network performance data with subjective video quality data becomes apparent. Note that subjective information from the user can be sufficient information to correlate with the network performance information such that video source quality information was not needed to make an assessment of video quality and one or more associated possible causes of errors or degradations.

In addition to the network performance data 1108 and the user feedback 1116, the data correlator 1114 can access other information that is useful for an assessment of video transmission and display at the user device. In one embodiment, video server performance and capacity data is recorded on a storage device 1112 which stores performance information concerning the video server. In one scenario, if the server has a fault, such as an inability to retain proper response time due to network faults or high traffic demands, then video transmission performance could be adversely affected which would result in poor or disrupted video streaming at the user device 1106. Under such conditions, knowledge of the video server conditions would be useful. The data correlator 1114 can also access storage device 1112 to obtain video server performance and capacity information for correlation with the subjective information available in storage device 1116.

Another source of information that is useful to augment the user feedback data and the network performance data is the road traffic and weather data available via database 1118. Here, as can be appreciated by one of skill in the art, weather aberrations can cause perturbations in performance of user equipment 1106. Thus, data correlator 1114 can access the weather and road traffic data and associate the local weather conditions between a relevant base station and the user equipment to determine if the atmospheric conditions are affecting video reception at the user equipment. Road traffic information may likewise be useful because road congestion may be an external source of wireless system usage. For example, given a congested section of roadway, cell phone usage may peak and aggregate to one or two cell towers or base stations. To accommodate the above-normal call volume, bandwidth available for each call being routed through those base stations, and thus video performance, may be compromised. Knowledge of such road traffic conditions can thus support an analysis of degraded video service.

Another source of information useful to correlate with user feedback data is call data record information available at database 1120. Call data record information contains information as to what communications links were established, broken down, or dropped by the user equipment 1106. When accessed, call data record information 1120 can be associated by the data correlator 1114 in order to provide an event reference for the video quality rating information with respect to the specific user equipment.

The data correlator 1114 can access information from the user feedback database 1116 and correlate the subjective information with information from a variety of databases; the network performance database 1110, the server performance database 1112, the weather and road traffic database 1118, and the call data record database 1120 along with time and location information. All or any of this databases may be accessed by the data correlator 1114. The data correlator can then associate the subjective video quality rating from the user with time and location information, network and video server performance information, call records, and environmental condition data and identify relevant perturbations which can have a cause and effect upon the received video quality presented by the user equipment to the user. These results can then be reported to a system administrator via report or in graphical display form 1122. The system administrator can then take the results and determine if the video quality data can be improved by system hardware or software adjustments, or take some other action.

One attribute of the present invention is that the video quality assessment is non-intrusive and neither requires a test signal nor access to or analysis of the original signal as previously used in the prior art. Also, the video quality assessment system can be used with or without test signals and with or without reference to the transmitted signal. Thus, the use of a test signal or the transmitted original video signal or is neither required nor excluded. The term "test signals" can be any signal, message, voice, data, still or moving image, or any other service or combination of services.

IV. CONCLUSION

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number, respectively.

The teachings of the invention provided herein can be applied to other systems, not necessarily the system described herein. The elements and acts of the various embodiments described above can be combined to provide further embodiments. Aspects of the invention can be modified, if necessary, to employ the systems, functions, and concepts of the various related technologies to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What is claimed:

1. A method comprising:
    establishing a communication to a wireless user device, the communication comprising a video transmission over a wireless network to the wireless user device;
    accepting subjective received video quality information from the wireless user device, the subjective information generated by a user of the wireless user device;
    correlating the subjective received video quality information with wireless network performance information affecting the wireless network;
    reporting a quality of the received video in association with a relevant subset of the wireless network performance information, wherein the quality of the received video is reported without knowledge of a video source quality.

2. The method of claim 1, wherein establishing a communication to a wireless user device comprises transmitting a stream of video images to the wireless user device.

3. The method of claim 1, wherein accepting subjective received video quality information from the wireless user device comprises:
    receiving data from the wireless user device indicative of a subjective received quality rating input by a user of the wireless user device, the quality rating input provided while the user was viewing the transmitted video.

4. The method of claim 3, wherein the quality rating input is time-stamped by the wireless user device.

5. The method of claim 3, further comprising receiving multiple instances of subjective quality ratings by a user, each rating time-stamped by the wireless user device.

6. The method of claim 1, wherein accepting subjective received video quality information from the wireless user device comprises:
    receiving data from the wireless user device indicative of a subjective received quality rating input by a user of the wireless user device, the quality rating input provided after completion of the transmitted video.

7. The method of claim 1, further comprising correlating the subjective received video quality information and the wireless network performance information with user call data records, road traffic records, weather records, location data, or video server performance data.

8. The method of claim 7, wherein the location data is determined by one of the group consisting of global positioning system data, time differential of arrival data, angle of arrival data, and user input data.

9. The method of claim 1, wherein reporting the quality of the received video in association with a relevant subset of the wireless network performance information comprises reporting the quality of the received video in association with data specifically related to network performance data during time of the received subjective video quality information and location information of the wireless user device.

10. A system for assessing quality of received video without knowledge of a video source quality, the system comprising:
    a wireless user device, the device receiving a video signal from a wireless network, the device accepting a subjective user input rating related to the received video signal;
    a data correlator receiving the subjective user input rating and associating the input rating with a call data record of the user and wireless network performance information, the association producing a video quality assessment record;
    a report generator, the report generator providing a plurality of video quality assessment records for examination, the records indicating the subjective user input rating providing an assessment of the quality of the received video without knowledge of the video source quality.

11. The system of claim 10, further comprising a network database connected to the data correlator, the network database providing network link routing and switching element performance data for association with the input rating.

12. The system of claim 10, further comprising a video server connected to the data correlator, the video server providing performance and capacity data for association with the input rating.

13. The system of claim 10, further comprising a road traffic and weather data source for association with the input rating.

14. The system of claim 10, wherein the data correlator also associates a time of the input rating and a location of the wireless user device with a time of the network event.

15. The system of claim 14, wherein the time of the input rating is determined from a time stamp provided by the wireless user device.

16. The system of claim 14, wherein the location of the wireless user device is determined by one of the group consisting of global positioning system data, time difference of arrival data, angle of arrival data, and a user input indicative of user location.

17. The system of claim 10, wherein the subjective user input rating comprises a user input provided while the user is viewing an image from the video signal.

18. The system of claim 10, wherein the subjective user input rating comprises a user input provided after the user is finished viewing an image from the video signal.

19. A computer readable medium that is not a transitory, propagating signal, the computer readable medium comprising instructions which, when executed by a processor, cause the processor to effectuate operations comprising:
- accepting subjective received video quality information from a wireless user device, the subjective information generated by a user of the wireless user device viewing a stream of video into the wireless user device;
- correlating the subjective received video quality information with wireless network performance information affecting a wireless network;
- reporting a quality of the received video in association with a relevant subset of the wireless network performance information, wherein the quality of the received video is reported without knowledge of a video source.

20. The computer-readable medium of claim 19, wherein correlating the subjective received video quality information with wireless network performance information affecting the wireless network comprises correlating the subjective received video quality information with a time of input of the subjective received video quality information, a location of the wireless user device, and network switching performance data.

* * * * *